(12) United States Patent
Gerö et al.

(10) Patent No.: US 12,170,606 B2
(45) Date of Patent: Dec. 17, 2024

(54) METHODS, NODES AND SYSTEMS IN A COMMUNICATION NETWORK

(71) Applicant: Telefonaktiebolaget LM Ericsson (publ), Stockholm (SE)

(72) Inventors: Balázs Peter Gerö, Budapest (HU); Dávid Jocha, Budapest (HU); János Harmatos, Budapest (HU); Róbert Szabó, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 350 days.

(21) Appl. No.: 17/618,187

(22) PCT Filed: Jun. 13, 2019

(86) PCT No.: PCT/EP2019/065568
§ 371 (c)(1),
(2) Date: Dec. 10, 2021

(87) PCT Pub. No.: WO2020/249217
PCT Pub. Date: Dec. 17, 2020

(65) Prior Publication Data
US 2022/0224630 A1    Jul. 14, 2022

(51) Int. Cl.
*H04L 45/02* (2022.01)
*H04L 45/18* (2022.01)
(52) U.S. Cl.
CPC .............. *H04L 45/04* (2013.01); *H04L 45/18* (2013.01)

(58) Field of Classification Search
None
See application file for complete search history.

(56) References Cited

U.S. PATENT DOCUMENTS

| | | | |
|---|---|---|---|
| 2004/0167982 A1* | 8/2004 | Cohen | H04L 61/4511 707/E17.112 |
| 2006/0259949 A1* | 11/2006 | Schaefer | G06F 16/122 726/1 |
| 2009/0168995 A1* | 7/2009 | Banga | G06F 16/958 707/999.01 |
| 2012/0036569 A1* | 2/2012 | Cottrell | H04L 63/0823 726/16 |
| 2014/0046772 A1* | 2/2014 | Raman | H04L 67/02 705/14.66 |
| 2018/0331927 A1 | 11/2018 | Eberlein et al. | |

OTHER PUBLICATIONS

Rekhter, Y. , et al., "A Border Gateway Protocol 4 (BGP-4)", Network Working Group, Request for Comments: 4271, Jan. 2006, pp. 1-104.

(Continued)

*Primary Examiner* — Xavier S Wong
(74) *Attorney, Agent, or Firm* — Murphy, Bilak & Homiller, PLLC

(57) ABSTRACT

In a method performed by a first node associated with a first domain of a communications network, a first message is sent (302) to a second node associated with a second domain of the communications network. The first message comprises an indication of a resource in the first domain that is available to the second domain. The first message further comprises an anonymised first global unique identifier associated with the first domain.

18 Claims, 11 Drawing Sheets

(56) References Cited

OTHER PUBLICATIONS

Walton, D., et al., "Advertisement of Multiple Paths in BGP", Internet Engineering Task Force (IETF), Request for Comments: 7911, Jul. 2016, pp. 1-8.
Abdullah, Zahraa N., et al., "Segment Routing in Software Defined Networks: A Survey", IEEE Communications Surveys & Tutorials, vol. 21, No. 1, First Quarter, 2019, 464-486.
ETSI, "Network Functions Virtualisation (NFV); Management and Orchestration", ETSI GS NFV-MAN 001 V1.1.1, Dec. 2014, 1-184.
Gero, Balázs Peter, et al., "5GEx Final System Requirements and Architecture", Deliverable 2.2, 5GExchange, Dec. 31, 2017, 1-181.
Salvat, Josep Xavier, et al., "Overbooking Network Slices through Yield-driven End-to-End Orchestration", CoNEXT '18, Heraklion, Greece, Dec. 4-7, 2018, 353-365.
Sonkoly, Balázs, et al., "UNIFYing Cloud and Carrier Network Resources: An Architectural View", 2015 IEEE Global Communications Conference (GLOBECOM), Dec. 6, 2015, 1-7.
Sun, Gang, et al., "Service Function Chain Orchestration Across Multiple Domains: A Full Mesh Aggregation Approach", IEEE Transactions on Network and Service Management, vol. 15, No. 3, Sep. 2018, 1175-1191.

\* cited by examiner

METHODS, NODES AND SYSTEMS IN A COMMUNICATION NETWORK

TECHNICAL FIELD

This disclosure relates to methods, nodes and systems in a communications network. More particularly but non-exclusively, the disclosure relates to resource orchestration in a communications network.

BACKGROUND

Resources in a communication network may be advertised and allocated by orchestration systems that are able to coordinate resource sharing between different domains (that may for example be provided or owned by different providers or network operators). In hierarchical orchestration systems, orchestrators advertise abstracted topology views and resources (also referred to as resources slices), to upstream orchestrators. To implement several orchestration hierarchies in parallel, (directly or remotely) neighboring orchestration domains exchange abstracted topology and resource advertisements.

For example, FIG. 1a illustrates a known scenario whereby domains 102, 104 106 and 110 each comprise an orchestrator to coordinate their respective resources. The domain 110 is an upstream domain of the domain 102, 104 and 106 in the illustrated orchestration hierarchy.

In addition to the orchestration hierarchy in FIG. 1a, several additional orchestration hierarchies may exist on the same topology, for example, domain 106 may sit on the top of another orchestration hierarchy to serve its own customer based via domain 110, with domains 102 and 104 as subordinate domains.

For commercial reasons, it may be undesirable for one domain to expose its network topology to another domain. Therefore, topology abstraction (or domain abstraction) may be employed whereby virtualized infrastructure managers (VIMs) hide the internal topology of resources and capabilities from their consumers. The simplest form of topology abstraction is when the whole topology of resources and capabilities are aggregated into a single node, such as a BigSwitch with BigSoftware (BiS-BiS) model (for example, see the Unify model used in the Fifth Generation Exchange (5GEx) architecture).

In hierarchical orchestration systems, multi-tenancy may occur whereby the same resources and capabilities are advertised to multiple consumers (e.g. there are multiple upstream orchestrators). In such a scenario, resource advertisements originated from a domain may reach a consumer via multiple routes through the communications network. If the source of the advertisements is hidden due to topology abstraction, then the consumer may take the same resources into account several times (e.g. double accounting may occur such that a consumer considers more resource to be available than is actually the case). This may result in significant overestimation of the amount of underlying resources and can result in a high blocking ratio of orchestration requests and long orchestration processes (if, for example, rollbacks are required).

Furthermore, if consumer and provider roles are situational (e.g. anonymous advertisements determined only by the flow of interactions), advertisements may be repeatedly forwarded around a looped path in the network. If the advertised resource is summed each time the looping advert is received, then the summed resource estimate may quickly increase towards infinity (e.g. similar to routing loops). Exposing the resource topology details, however, is undesirable however due to both commercial considerations and scalability concerns.

Border Gateway Protocol (BGP) protocol [rfc4271] is an Internet routing protocol that provides Autonomous System (AS) level loop prevention in data traffic as well as loop prevention of the BGP control plane traffic. Each BGP advertisement contains an AS path vector that lists all AS IDs that the BGP advertisement traversed. All advertisements with a loop in the AS path vector are filtered and not distributed any further.

However, by default, BGP only distributes the best (or shortest) path to a given destination. To support advanced use cases, such as traffic engineering, BGP extensions [rfc7911] allow the distribution of several advertisements for the same destination which may result in overestimation of available resources as described above. The disclosure herein addresses aims to address some of these problems.

SUMMARY

As described above, topology abstraction may result in over-estimation of available resources if the same (anonymous) resource advertisements are send via different paths (multi-tenancy) through a communications network or if advertisements begin to loop.

As described briefly above, one characteristic of generic topology abstraction is that a domain only gets an aggregated view from lower level domains (e.g. other domains advertising to it). Thus, it is not known if a resource estimation contains multiple resource units coming from different source domains; due to the aggregated view, the source domain of a given resource estimation cannot be identified.

Furthermore, if the advertisement paths are hidden, a domain cannot recognize if it gets advertisement of the same resource unit on multiple paths. Therefore, when topology abstraction is used, there may not be enough information for the proper handling of incoming resource advertisements by any given certain domain.

Although an AS vector like behavior may be sufficient for loop prevention in a multi-AS control plane, it reveals the identity of the domains through which the advertisements traverse which, as noted above, can be undesirable from both a commercial and technological perspective.

To prevent loops in the data plane, BGP selects paths with the shortest AS path (i.e. the decision is based on the number of elements contained in the AS path), however this information is unnecessary for loop prevention of the control plane. Furthermore, BGP distributes only the best (or best N) routes to a destination and filters advertisements with longer AS paths. For orchestration purposes, filtering advertisements received on longer AS paths limits deployment options.

More generally, solutions defining generic treatment rules for the incoming resource advertisements may not be theoretically possible.

Another solution may be to enable the advertisement of topology information and thus enable resource advertisements containing the source of a given resource type/volume, however this would make the information hiding (i.e. the topology abstraction) invalid and completely lose any possible advantages of such topology abstraction.

There is thus a need for improved resource orchestration, particularly when topology abstraction is employed between domains.

Thus according to a first aspect herein, there is provided a method performed by a first node associated with a first domain of a communications network. The method comprises sending a first message to a second node associated with a second domain of the communications network, the first message comprising an indication of a resource in the first domain that is available to the second domain. The first message further comprises an anonymised first global unique identifier associated with the first domain.

In this way, the first node may send a message containing an indication of resources on the first domain (e.g. a resource advertisement), with a global unique identifier that may be used to provide an anonymous indicator of the source of the message. This may be used, for example, to keep track of the source of resource messages in a communications network in order to prevent double accounting of the same message. Furthermore, although the global unique identifier may be anonymous, the first node may recognize messages comprising its own global unique identifier and thus (as will be described in more detail below) the first node may be able prevent looping of its own messages.

According to a second aspect there is a first node in a communications network. The first node is adapted to send a first message to a second node associated with a second domain of the communications network, the first message comprising an indication of a resource in the first domain that is available to the second domain. The first message further comprises an anonymised first global unique identifier associated with the first domain.

According to a third aspect there is a node in a communications network. The node comprises a processor. The processor is configured to perform the method of the first aspect.

According to a fourth aspect there is a system in a first domain of a communications network. The system comprises a memory comprising instruction data representing a set of instructions, and a processor configured to communicate with the memory and to execute the set of instructions. The set of instructions, when executed by the processor, cause the processor to send a first message to a second node associated with a second domain of the communications network, the first message comprising an indication of a resource in the first domain that is available to the second domain. The first message further comprises an anonymised first global unique identifier associated with the first domain.

According to a fifth aspect there is a computer program product comprising a computer readable medium, the computer readable medium having computer readable code embodied therein, the computer readable code being configured such that, on execution by a suitable computer or processor, the computer or processor is caused to perform the method of the first aspect.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

As described above, in communications networks where topology abstraction is employed, it may be difficult to accurately estimate available resources in the communications network, particularly if messages advertising the same (anonymous) resources are send via different paths through the communications network to a node.

Figure 1:
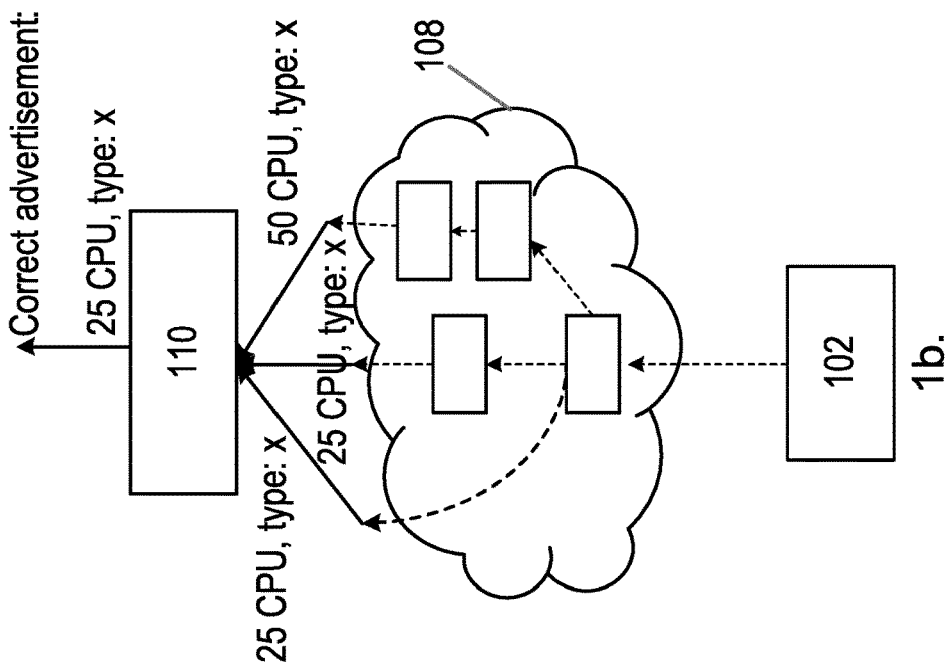
FIGS. 1a and 1b show prior art configurations of an example communications network.
Figure 1:
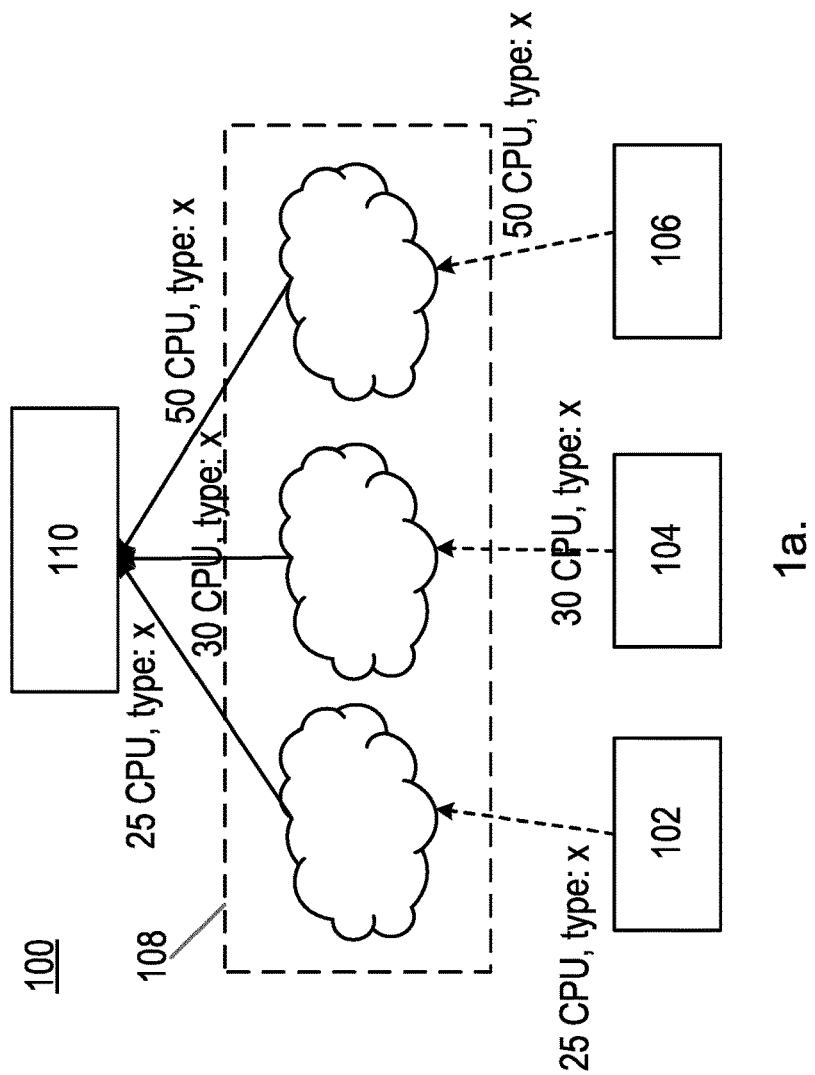

FIGS. 1a, 1b, 2a and 2b illustrate some of the prior art issues that may be faced in domain orchestration when topology abstraction is employed. FIG. 1a illustrates three domains 102, 104 and 106 all sending messages comprising resource estimates of resources available on their respective domains. The estimates may pass through other nodes and/or domains 108 and be received by domain 110. Domain 110 thus receives messages (e.g. advertisements) on its southbound interface from the different source domains 102, 104 and 106. In this case, the proper treatment of advertised resources is the summation (aggregation) of the resource units. Domain 110 thus sums the incoming advertised available resources according to resource type and sends out (e.g. on its northbound interface) the summation or combined resource estimation. In this example, the estimate in the outgoing message is a correct estimation of the available resources.

FIG. 1b illustrates another scenario, whereby Domain 102 sends a message comprising a resource estimate of 25 CPU of Type X. The message travels through different paths through the communications network 108, resulting in the domain 110 receiving the same resource estimate from many different sources. Because topology abstraction is used, domain 110 has no way of knowing that the incoming messages all relate to resource available on domain 102. In this example, summing the resources in the incoming messages would lead to multiplication of the same resource volume, resulting in a higher blocking probability when trying to deploy a resource request (as on upper level domains more resource is seen than really available). Advertised resource volumes can thus significantly differ from the volume that is actually available. Depending on a domain's resource handling operations, both under- or over calculations are possible, and these could be significant.

Furthermore, the orchestration topology may experience loops, when a message (e.g. advertisement) from a given domain (or an aggregated advertisement that contains the advertisement of the domain) is looped back to the southbound interface of the given domain. If topology abstraction is used then the domains in the loop cannot identify that there is a loop in the hierarchy. In such a scenario, the loop may continue infinitely, with the resources of incoming (looped) messages being summed each time.

Figure 2A:
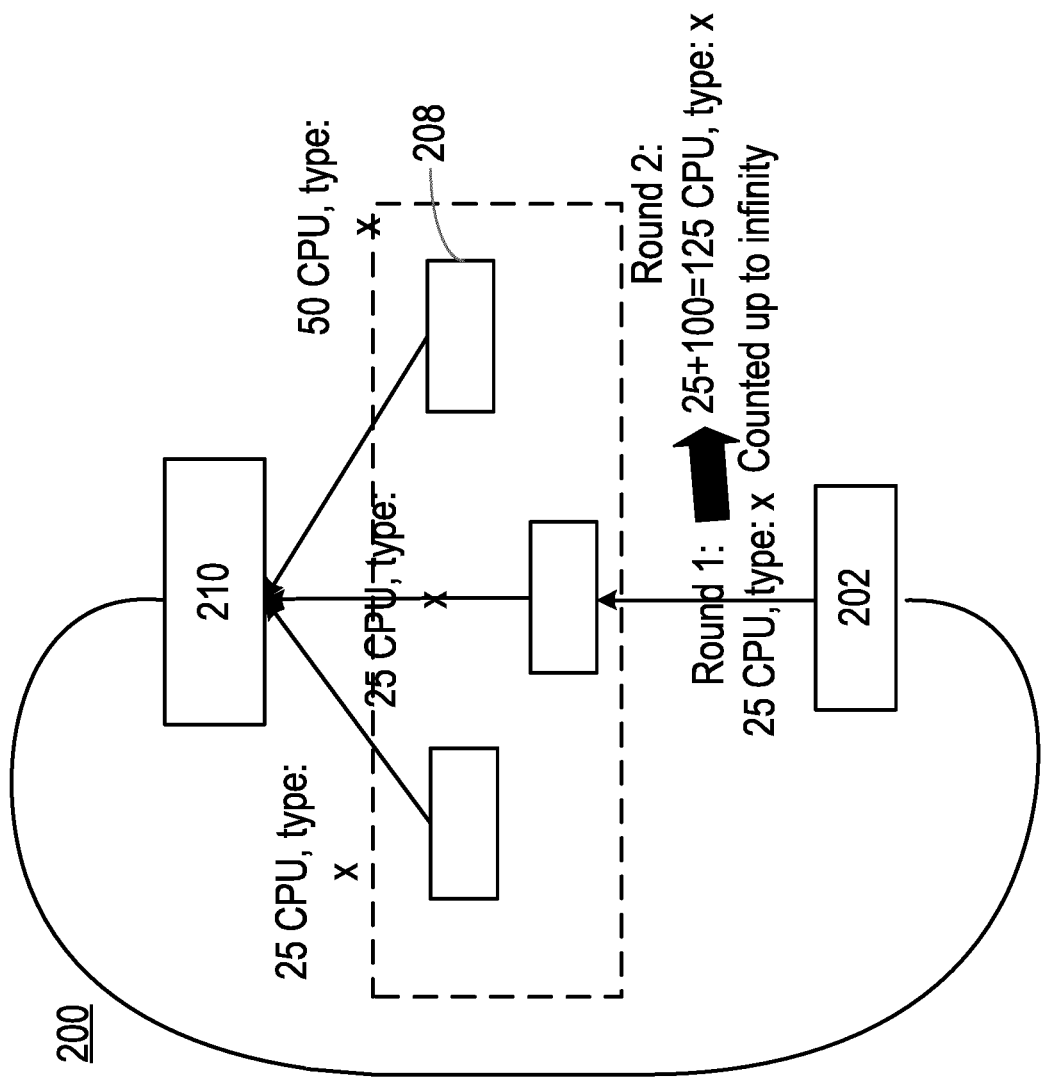
FIGS. 2a and 2b illustrate prior art examples of messaging in an example communications network.
Figure 2B:
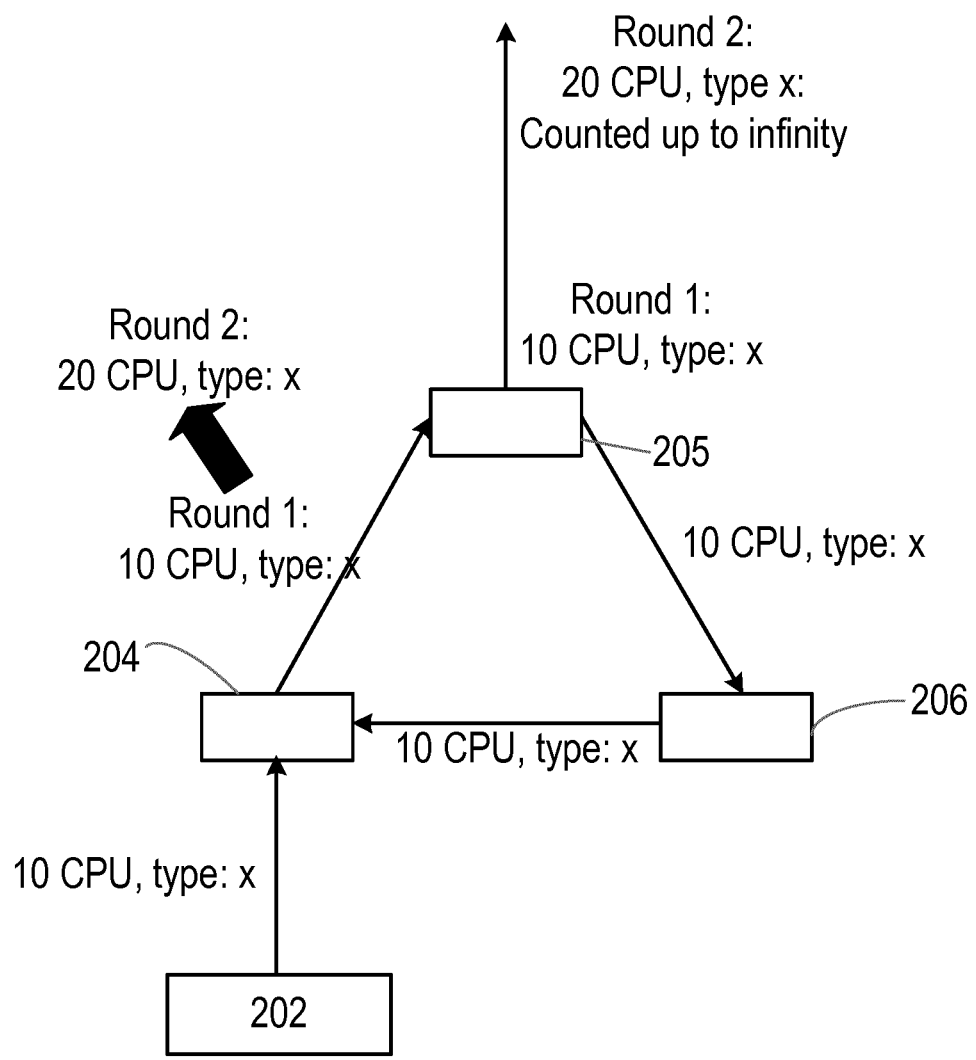

FIG. 2 shows two illustrative prior art examples of when the looping problem occurs. In the first case, shown in FIG. 2a, the loop contains the source domain of a given resource unit, while in the second case as shown in FIG. 2b, the loop does not contain the source domain.

In FIG. 2a, a message comprising a resource estimate of 25 CPU of type x for domain 202 is forwarded through intermediate domains 208 to 210. The message reaches domain 210 from different paths and thus domain 210 sums the duplicated messages and forwards an incorrect resource estimate of 100 CPU of type x to domain 202. The path of the messages through the network has thus looped and in the second round of the loop, if domain 202 adds its available 25 CPU of type x to the looped resource estimate, then domain 202 may incorrectly advertise 125 CPU of type x. In this scenario, the resource estimate originating from domain 202 may continue to loop with the resource estimate increasing each loop.

In FIG. 2b a resource estimate of 10 CPU of type x is sent by domain 202 to domain 204. If there is a looped path such as that illustrated by domains 204, 205 and 206 in the network, then the resource estimate originating from domain 202 may continue to loop with the resource estimate increasing each time.

In summary, although domain topology abstraction hides intra- and inter-domain topology as well as per-domain advertised resources of the lower level domains, this aggregated view results in improper treatment of incoming resource advertisement messages as correct treatment of duplicated messages is not possible and loops cannot be detected. This may lead to serious resource advertisement errors.

The objective of this disclosure is thus to provide an advertisement model and data treatment methods, which results in adequate resource advertisement handling as well as loop handling, whilst employing domain abstraction, e.g. whilst still hiding the inter-domain topology, as well as the source domain of a given resource volume.

Figure 3:
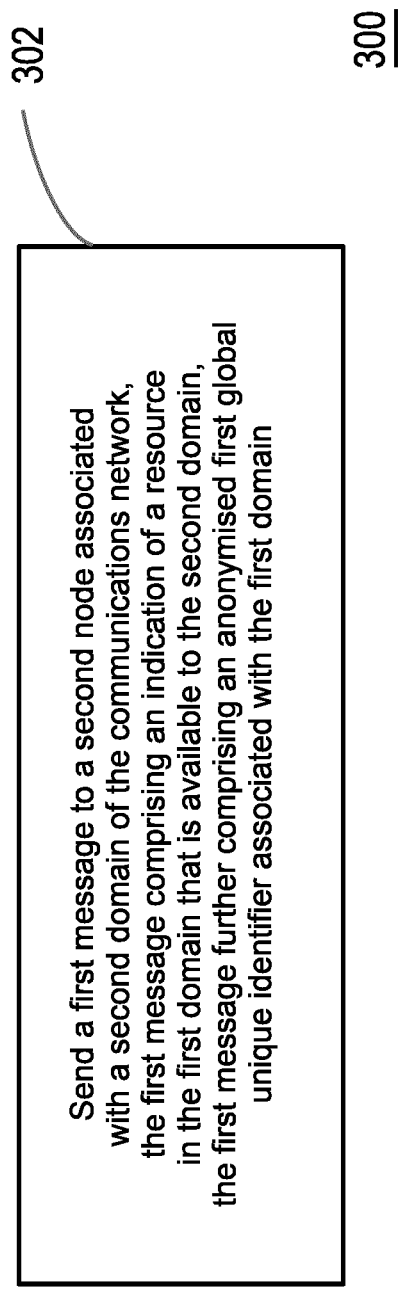
FIG. 3 is a flow chart illustrating an example method performed by a node in a communications network according to some embodiments herein.

Turning now to FIG. 3, according to some embodiments herein there is a method 300 performed by a first node associated with a first domain of a communications network. The method 300 comprises, in a first block 302, sending a first message to a second node associated with a second domain of the communications network. The first message comprises an indication of a resource in the first domain that is available to the second domain. The first message further comprises an anonymised first global unique identifier associated with the first domain.

The communications network may comprise any network for sending or receiving information over wireless and/or wired connections. In embodiments where the first domain and the second domain are operated by different operators (e.g. inter-operator orchestration), the communications network may comprise a wired connection. Other examples of communications networks include but are not limited to, for example, cellular communications networks such as a 2G, 3G, 4G or 5G cellular networks, or wireless local area networks (WLAN) or Wi-Fi networks.

The communications network comprises first and second domains. The first domain comprises a plurality of network nodes including the first node. The first domain may be associated with (e.g. owned or operated by) a network operator. In some embodiments the first and second domains are associated with different network operators.

In some embodiments, as described above, the first domain may use topology abstraction (as described above) in order to, for example, hide a network configuration from the second domain.

The first node may comprise any node in the first domain that is suitable for sending a message to the second node. In some embodiments the first node may be involved in resource orchestration. In some embodiments the first node may comprise a resource orchestrator. More generally, for example, the first node may comprise an access point (AP) (e.g., a radio access point), a base station (BSs) (e.g., a radio base station, a Node B, an evolved Node B (eNB) an NR NodeB (gNB)) or any other node suitable for performing the method 300 as described herein. In some embodiments, the first node may comprise a server. For example, such a server may employ cloud technology or be located (e.g. distributed) in a cloud environment.

The second node may comprise any node in the second domain that is suitable for receiving a message from the first node. In some embodiments the second node may be involved in resource orchestration. In some embodiments the second node may comprise a resource orchestrator. More generally, the second node may comprise any of the node types described above with respect to the first node.

In first block 302 of the method 300, the first node sends the first message to the second node. The first message comprises an indication of a resource in the first domain that is available to (e.g. available for use by) the second domain. As such, the first message may comprise an advert of an available resource on the first domain, e.g. the first message may comprise a resource advertisement. The skilled person will appreciate that the indication of a resource available on the third domain may take different forms. For example, the indication may comprise, for example, a numerical value (e.g. the numerical value corresponding to the resource estimation), or, for example, it may comprise an enumeration or mapping from which the available resource may be determined. The skilled person will be aware of other forms that the indication may take. It will also be appreciated that the first node may send (or broadcast) the first message to other domains in addition to the second domain.

The first message further comprises an anonymised first global unique identifier associated with the first domain. The first global unique identifier is anonymised such that it is unrelated to information that may be used to identify the first domain. As such, when the first message is received by the second node, the second node is unable to determine that it is the first domain that is advertising the resource. In this way, the advertised resource (i.e. the indicated resource in the first domain) is associated with a global unique identifier associated with the domain (e.g. location) of the available resource, without revealing the underlying domain. This may ensure that source domain of a resource advertised in the first message remains hidden. Furthermore, the AS topology may also remain hidden (e.g. the path between the second domain and the first domain cannot be determined), thus the dependencies among the domains remain hidden.

More generally, the first global unique identifier may be assigned to the advertised volume of a given resource type by the first domain (e.g. as the source domain). The first global unique identifier may be thought of as an assistance parameter for domain resource advertisement as it may enable other domains to determine if messages (e.g. advertised resource volumes) arriving on different southbound interfaces were generated by the first domain (or more generally, the same source domain) or not. In view of the fact that the first global unique identifier is globally unique, it may be guaranteed that advertised resource volumes originating from different domains have different identifiers. Furthermore, as noted above, if the first global identifier is a generic identifier (e.g. a n digit long number), there may be no direct relation between a global unique identifier and any domain identifier that may be used to identify the associated first domain (e.g. domain name, etc).

The skilled person will be familiar with various ways to create an anonymous global unique identifier. For example a hash function may be applied to a domain identifier for the first domain, which may guarantee both the uniqueness and that the first domain cannot be resolved on the basis of the first global unique identifier. Alternatively, in some embodiments, the first domain may broadcast a new identifier (without specification of itself) over the orchestration hierarchy to determine if any other domain uses the same identifier. If no alert on the usage of the same global unique identifier arrives then it may be used by the first domain. As an alternative, all domains in the communications network may maintain a list of used global identifiers, as obtained from other incoming messages, and thus if the first domain needs to introduce a new one, it may check the list of known global unique identifiers and generate a different one. It will be understood however, that these are merely examples and that the skilled person will be familiar with other ways of creating the first global unique identifier.

The first global unique identifier may be recognised by the first domain (e.g. each domain may recognise its own global unique identifier) and thus, as will be described in more detail below, the first domain may recognise and prevent its own messages from looping in the manner shown in FIG. 2a.

In some embodiments, the first message further comprises an indication of an upper limit of the resource in the first domain. The upper limit may indicate the total resource of the first domain (e.g. if none of the resources of the first domain were in use). As such, the upper limit may be used to ensure that subsequent domains do not advertise more resources for the first domain than the first domain actually (physically) has.

As such, instead of a scalar type of resource advertisement (a single number per resource type, which is applied in the pure BiS-BiS model), in some embodiments herein, resources may be advertised by sending a message comprising a resource advertisement vector in the following format:

Advertisement vector: {Resource_type: Volume_of_resource_type (Limit) [S_ID]} where S_ID represents the global unique identifier of the source domain (e.g. the domain on which the resource is available) and Limit represents the maximum possible resource available on the source domain.

As an illustrative example, if the first domain has a first global unique identifier "A", has maximum (e.g. upper limit) resources of 10 CPUs of type x, 5 of type y and 20 of type z, and it wants to advertise 10 CPU of type x, 5 CPU of type y and 15 CPU of type z, then the first message may comprise the following:

Advertisement vector: {Type[x]: 10 CPU(10)[A]; Type [y]: 5 CPU(5)[A]; Type[z]: 15 CPU(20)[A]}

As well as sending messages to advertise its own resource(s) as in the examples above, the first node may also receive messages (e.g. advertisements) from other nodes about resources available in other domains. The first node may collate indications of resources available on other nodes and advertise these separately or in the same message as it advertises its own resources.

As such, in some embodiments the method 300 may further comprise receiving a second message, comprising an indication of a resource available on a third domain and an anonymised third global unique identifier associated with the third domain.

When the first node receives the second message, it may first check that the message does not comprise information about its own resource availability that have taken a circuitous path through the communications network and been looped back to itself. As such, in some embodiments the method 300 may further comprise comparing the first global unique identifier (e.g. the global unique identifier associated with the first domain) to the third global unique identifier (e.g. the global unique identifier in the received message). If the first global unique identifier matches the third global unique identifier, the first node may thus determine that a loop has occurred. If a loop is determined in this way, then the first node may, for example, prevent the information in the received message from propagating further and instead send the first message with a correct indication of its available resources.

If the first global unique identifier and the third global unique identifier are not matching, then the second message comprises information about resources available on a different domain to the first domain (e.g. a domain which we refer to herein as the third domain). The method 300 may then comprise comparing the third global unique identifier to one or more other global unique identifiers in one or more other received messages to determine one or more matching messages wherein the global unique identifiers in the one or more matching messages are equal to the third global unique identifier. Put another way, the first domain may search for other resource advertisements that also advertise resources for the third domain. The method may then comprise determining an estimation of the available resources on the third domain from the indication of a resource available on the third domain in the second message and indications of available resources comprised in the one or more matching messages.

The other received messages may comprise other resource advertisements, received by the first node. Each of the other received messages may comprise, for example, an indication of a resource available on a node, an upper limit to the resource on said node, a global unique identifier associated with said node and/or the type of resource available. Such information may be arranged according to the advertisement vectors described above. The second and other messages may have been received for example, on different (southbound or incoming) interfaces of the first node.

In some embodiments, determining an estimation of the available resources on the third domain may comprise summing the resource available on the third domain as indicated in the second message to the available resources as indicated in the one or more matching messages.

Put another way, incoming messages comprising resource advertisements containing the same global unique identifier (e.g. the global unique identifier for the third domain) may be grouped together and the resource estimates for the third domain in each of the messages may be summed to produce an estimation of the available resources on the third domain.

In some embodiments, the resources may be summed by type. As described above, more generally, if the first domain has multiple southbound interfaces, it may check all incoming messages (e.g. all advertisement vectors) on southbound interfaces and search for matching global unique identifiers and matching resource types and sum the indicated resource availabilities by type. Thus, in some embodiments, determining an estimation of the available resources on the third domain may comprise aggregating vector elements in the second message and the one or more other received messages according to resource type and/or the global unique identifiers therein.

Mathematically, this may be written as:

$$R_{domain}^{type,S\_ID} = \sum_m R_{m\_in},$$

where $R_{m\_in}$ is a received message comprising an indication of a resource available of a given resource type, associated with a global unique identifier, S_ID, on the $m^{th}$ southbound interface (of the first node), and $R_{domain}^{type,S\_ID}$ is the sum of the advertised resources having the same global unique identifier (e.g. originating from the same source).

Figure 4:
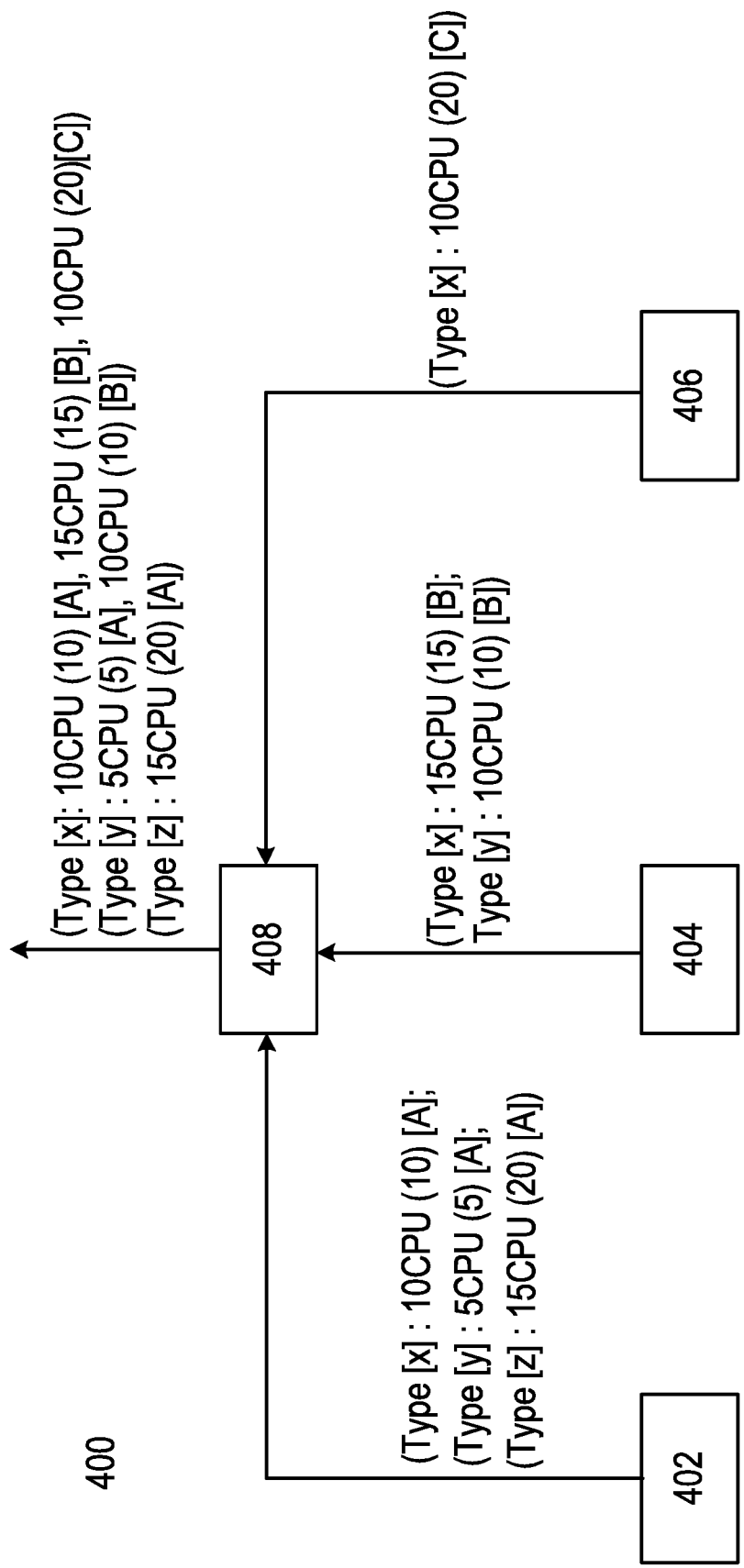
FIG. 4 is a signal diagram that illustrates example signals that may be sent between nodes in a communications network according to some embodiments herein.

This is illustrated in FIG. 4 which illustrates part of a communications network 400 whereby a first domain 408 receives messages from domains 402, 404 and 406 having global unique identifiers A, B and C respectively. In this example, domain 402 sends a message to domain 408 comprising:
 (Type[x]:10 CPU(10) [A]; (Type[y]:5 CPU(5) [A]; (Type [z]:15 CPU(20) [A]) domain 404 sends a message comprising:
 (Type [x]:15 CPU(15) [B]; (Type [y]:10 CPU(10) [B]) and domain 406 sends a message comprising:
 (Type [x]:10 CPU(20) [C]).

Domain 408 receives the three messages and aggregates the vector elements according to type and sends out a message from its northbound interfaces comprising the following:
 (Type[x]:10 CPU(10) [A], 15 CPU(15) [B], 10 CPU(20) [C])Type[y]:5 CPU(5) [A], 10 CPU(10) [B]) Type[z]: 15 CPU(20) [A])

It will be appreciated by the skilled person however that other combinations may also be used, for example, in some embodiments, determining an estimation of the available resources on the third domain may comprise taking an average (e.g. mean or median), a minimum or a maximum estimate of the indicated available resources for the third node as found in the second and one or more matching messages.

In some embodiments, the second message further comprises an indication of an upper limit of the resource in the third domain and the method may further comprise comparing the summation to the upper limit.

In a similar way as described above with respect to the upper limit of the resource in the first domain, the upper limit of the resource in the third domain may describe the maximum resource that the third domain can or would advertise as being available (this may be, for example, a physical limit or a commercial limit). Comparing the summation to the upper limit in this way, enables the first node to quickly determine whether the summation is likely to be an overestimation of the true resource availability on the third node, as the summation should generally not be greater than the upper limit.

There are thus two outcomes of comparing the summation to the upper limit.
 Case 1: If $R_{domain}^{type,S\_ID}$<Limit for the given resource type and global unique identifier (denoted S_ID), then the incoming resource partitions can be added and this value could be advertised on a single northbound interface. (Note: for the same type and S_ID, always the same Limit is advertised.)

Thus, if the summation is less than the upper limit, in some embodiments, the method 300 may comprise using the summation as the estimation of the available resources on the third domain.
 Case 2: If $R_{domain}^{type,S\_ID}$>Limit for the given resource type and S_ID, then the summation is an overestimation of the resources available on the third node and then maximum the Limit volume may be advertised on a single northbound interface.

Thus, if the summation is greater than the upper limit, in some embodiments, the method 300 may comprise using the upper limit as the estimation of the available resources on the third domain. In this way, the upper limit may be advertised instead of a value that is known to be greater than the maximum resource on the third domain. In this way, serious overestimations of resources, e.g. due to loops and multi-tenancy (as described above) may be prevented from propagating through the network (e.g. by advertising the upper limit instead).

In some embodiments the method 300 may further comprise including the estimation of the available resources on the third domain and the third global unique identifier in the first message to advertise the estimated available resources on the third domain to the second domain.

Turning now to other embodiments, in some embodiments, statistical multiplexing may result in a given domain advertising a higher volume of a given type of resource on its northbound interfaces than was received on the southbound ones. Two alternatives of resource treatment may be applied when a domain performs statistical multiplexing.

Firstly, in some embodiments, if the first domain comprises more than one (e.g. first and second) northbound or outgoing interfaces, the summation may be divided (e.g. split or partitioned) between the northbound interfaces. In such a scenario, in some embodiments, the upper limit is not exceeded on any individual interface (even though, e.g., the sum of the advertised resources advertised over the north bound interfaces may be over the upper limit).

Thus in some embodiments the method may comprise dividing (e.g. partitioning or splitting) the summation into a first part and a second part (e.g. first and second partitions), where the first and second parts are (e.g. each) less than the upper limit. The method may then comprise including (e.g. advertising) the first part of the summation in a third message, including (e.g. advertising) the second part of the summation in a fourth message, and sending the third and fourth messages from different interfaces of the first domain. In this way the summation of the advertised resources on the southbound interfaces may be split over more than one interface over the northbound interfaces of a domain.

Mathematically, this is represented as:

$$\sum_n R_{n_{out}} > R_{domain}, \text{ but for any northbound interface } n, R_{n_{out}} < \text{Limit}$$

In some embodiments, the first part and the second part are associated with the third global unique identifier in the third and fourth messages (e.g. the resources are advertised with their source global unique identifier.) The third and fourth messages may also comprise the upper limit for the third domain and in some embodiments this may not be modified by the first domain.

In other embodiments, resources may be over provisioned on a single northbound interface. If for any northbound interface n, $R_{n\_out}$>Limit then the following rules may be applied.

For the overprovisioned part of the resource, the first domain may introduce a new partition and a new global unique identifier. As an example, the first domain may determine to overprovision resources from a third domain having a global unique identifier "A". (e.g. the first domain may advertise more than the upper limit value associated with the third domain). The first domain may advertise the over-provisioned portion using a new global identifier "D" as follows:

Type[x]: 10 CPU(10)[A]→Type[x]: 10 CPU(10)[A], 5 CPU(5)[D]

Thus, in some embodiments, if the summation is greater than the upper limit, the method 300 may further comprise determining to overprovision the resource available on the third domain, and including an indication of the overprovisioned resource in the first message, wherein the overprovision is associated with a new global unique identifier.

In some embodiments, the first domain may specify an upper limit value for the new partition associated with the new global identifier. In some embodiments, the upper limit value of the third domain (e.g. the original resource part) may not be modified.

The first domain could alternatively advertise the partition under its own global unique identifier (e.g. the first global unique identifier). As such, in some embodiments, if the summation is greater than the upper limit, the method 300 may further comprise determining to overprovision the resource available on the third domain, and including an indication of the overprovisioned resource in the first message, wherein the overprovision is associated with the first global unique identifier.

Figure 5:
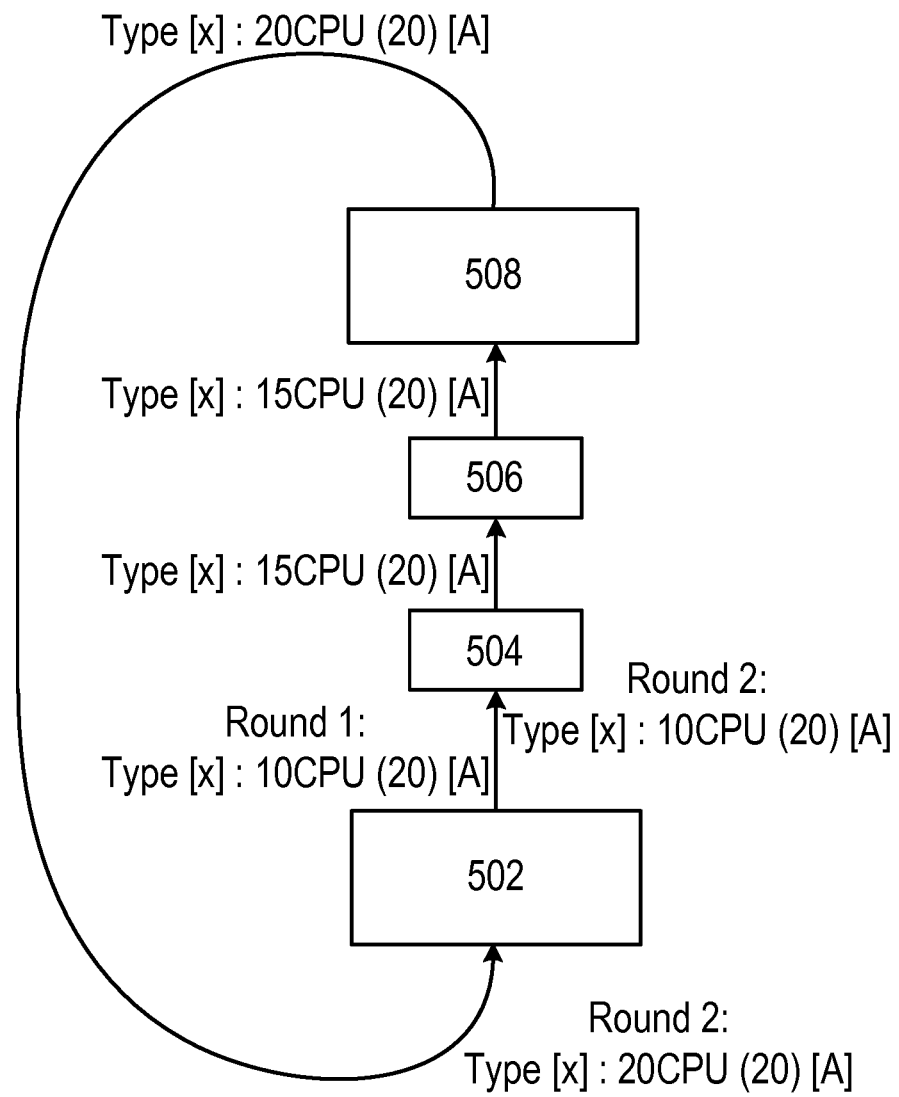
FIG. 5 is another signal diagram that illustrates example signals that may be sent between nodes in a communications network according to some embodiments herein.

Turning now to FIG. 5. FIG. 5 illustrates how the use of anonymized global unique identifiers and the upper limit parameter as described herein may be used to improve resource handling. In FIG. 5, domain 502 with global unique identifier "A" and upper limit (20) advertises a resource vector:

(Type [x]: 10 CPU (20) [A]).

This is received by domain 504 which sums the vector to another incoming advert advertising resources with global unique identifier "A" from another domain (not shown in FIG. 5). Domain 504 thus advertises the vector:

(Type [x]: 15 CPU (20) [A]) to its north bound interfaces. The advertisement is processed by domains 506 and 508. Domain 508 may receive messages (advertisements) associated with the global unique identifier "A" that sum to greater than the upper limit value of 20, however in such a scenario, domain 508 advertises the upper limit value rather than a value higher than the upper limit value. This prevents serious overestimation e.g. above the physical limit of domain 502 of available resources. Furthermore, if the advert is looped back to domain 502, domain 502 may recognise its own global unique identifier "A" and in a second round of signalling, correct the advertised resource. Thus preventing looped adverts from summing to infinity.

As a further improvement to the foregoing embodiments, in some embodiments of method 300, the second message may further comprise an indication of a path through the communications network from the third domain to the first domain, wherein the path comprises indications of one or more intermediate domains that the indication of a resource available on a third domain has passed through. The indications of one or more intermediate domains may be anonymous indications. This may allow topology abstraction to be maintained whilst providing an anonymous indication of a path through the communications network.

As such, according to some embodiments herein, a resource advertisement vector may comprise the following elements:

Advertisement vector: {Resource_type: Volume_of_resource_type (Limit) [S_ID][Path_TAG]}

It will be appreciated by the skilled person that the advertisement vector may comprise additional elements and/or the elements may be ordered differently to the order indicated in the advertisement vector above.

The path, (also referred to herein as the "Path_tag") may contain the global unique identifiers of the domains through which a given resource advertisement vector has passed. As such, when a certain resource advertisement is passed through a domain, the domain may code a certain Path_ID to the Path_tag part of the advertisement. Generally, the Path_ID may be related to, or different from the global unique identifier of the domain. If a domain has multiple northbound interfaces the domain may use different Path_IDs on the different northbound interfaces. This may be advantageous, for example, to determine whether a domain is included in multiple loops (e.g. different interfaces in different loops). Based on the different Path_IDs in a Path_tag, a domain may adequately determine which advertisement vector is looped, so the particular interfaces included in a loop may be identified.

The Path_ID may be globally unique, e.g. known only by the respective domain. Since the Path_tag field is anonymous, a certain domain can only identify itself in it, but other Path_IDs included in the Path_tag may not be retrieved. This guarantees that the inter-domain topology, as well as the advertisement path of a certain resource unit is not resolvable.

Therefore, generally speaking, in some embodiments of the method 300, the first domain may be able to determine whether the first global unique identifier is comprised in the path. In some embodiments the first domain may be unable to determine information that may be used to identify the one or more intermediate domains from the path.

In some embodiments, the path may comprise an aggregation of the global unique identifiers associated with the intermediate domains. The skilled person will be familiar however with other possible implementations of a path which may satisfy the criteria above, for example the path may be implemented using a Bloom filter.

When the second message received by the first domain comprises a path, the following steps may be taken.

In some embodiments, the method 300 may further comprise determining whether the first global unique identifier is indicated in the path. By checking the path for its own global unique identifier, the first node may determine whether such a message (e.g. advert) has already passed through the first domain.

In some embodiments, if the first global unique identifier is indicated in the path, the method 300 may further comprise determining that a loop has occurred.

In some embodiments, if the first global unique identifier is indicated in the path (e.g. if a loop has occurred) the method may comprise comparing the path in the second message to another path in a previous message sent by the first node in order to advertise a previously calculated estimation of the available resources on the third domain, and if the path and the other path are matching, using the indication of a resource available on a third domain from the second message as the estimation of the available resources on the third domain. For example, previous message sent by the first node may comprise a northbound (or outgoing) advert. As such, the first node may determine whether the path tags on the north and south bound interfaces of the first domain are the same and if so, advertise, or continue to advertise the resource available on a third domain as in the second message.

The method may further comprise including (e.g. advertising) the indication of a resource available on a third domain from the second message, the anonymised third global unique identifier and the indication of the path in the first message. This may advertise the available resource on the third domain to the second domain. Thus, the first node may forward the looped message without summing other resource estimates for the third node to the looped resource estimate (e.g. the first node may assume that these messages have already been accounted for in the estimate in the second message.)

If the first global unique identifier is not indicated in the path, then the second message has not already been processed by the first node (e.g. it is not in a loop). In such a scenario, the first node adds the first global unique identifier (e.g. its own ID) to the path. The first node may then look for other messages or advertisements that it has received (e.g. on other southbound interfaces) that contain indications of resources available for the third domain. The paths (e.g. Path_tag field of the resource advertisements) of advertisements arrived on different southbound interfaces may then be unified and the resource volumes summed as was described above with respect to method 300. The first domain may then store the details of the incoming advertisements (global unique identifiers, Path_tags, resource volumes) are considered when advertisement for northbound interface(s) is assembled for a given global unique identifier.

More generally, if the first global unique identifier is not indicated in the path, the method 300 as described above may further comprise comparing the path in the second message to one or more other paths in the one or more other received messages. In embodiments described above, whereby one or more matching message were determined, in some embodiments, determining one or more matching messages may comprise determining one or more matching messages wherein the global unique identifiers in the one or more matching messages are equal to the third global unique identifier and the paths in the one or more matching messages are different. In this way, the summation of available resources on the third domain, as determined from the second and matching messages, may take into account only those resource estimates from different paths. In this way resource estimation for the third domain may be improved by reducing double-accounting due to looped messages.

In some embodiments, if the first global unique identifier is not indicated in the path and thus a summation of the resource estimates for the third node is made based on matching messages containing the third global unique identifier and different paths, the method 300 may further comprise combining the paths in the one or more matching messages to create a combined path, modifying the combined path to indicate that the first message has passed through the first domain, and including the modified combined path in the first message. In this way, the first message contains a path indicating all of the domains through which information about the third domain has passed.

Figure 6:
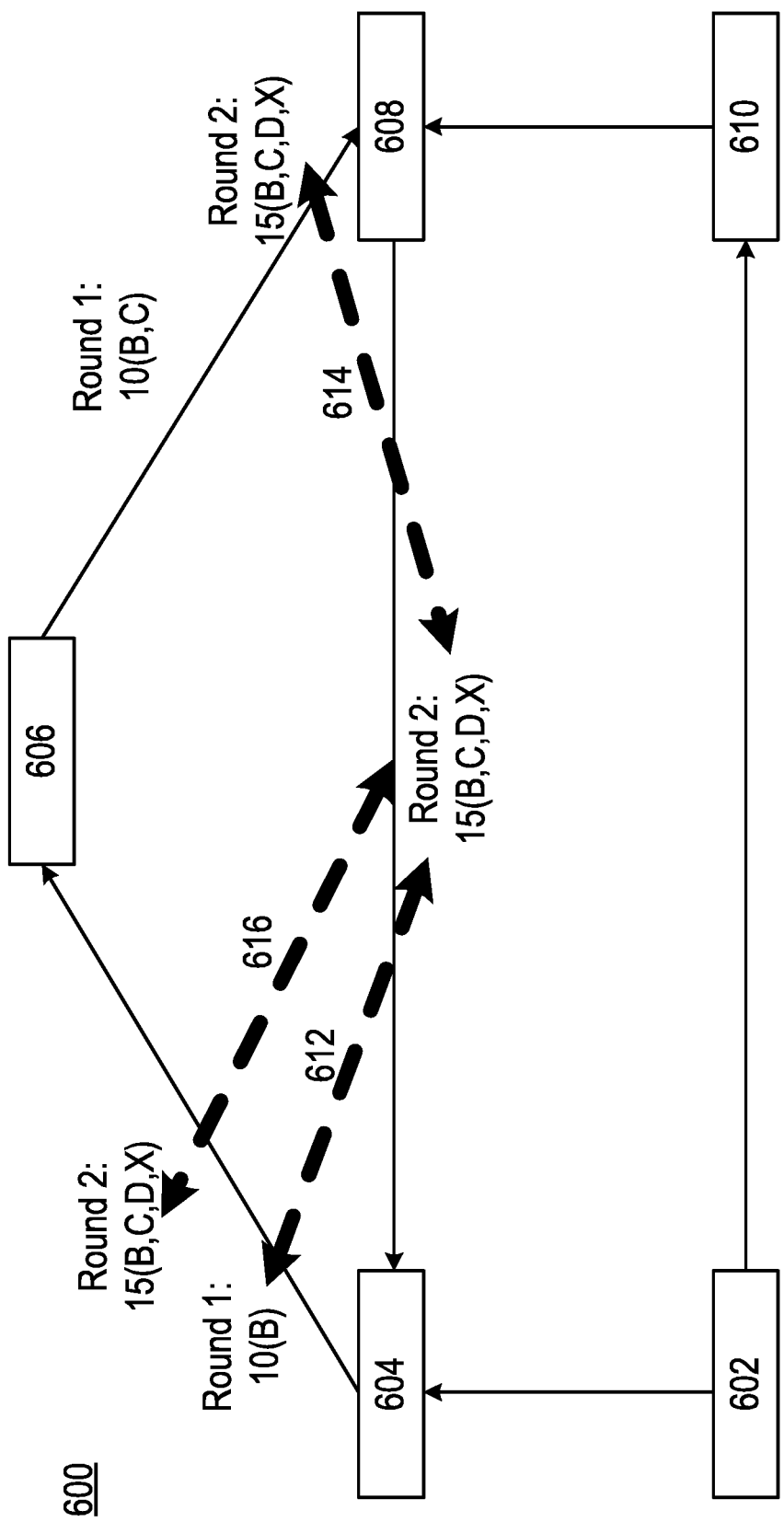
FIG. 6 is another signal diagram that illustrates example signals that may be sent between nodes in a communications network according to some embodiments herein.

FIG. 6 illustrates some of these principles. In the example in FIG. 6, for simplicity, only the resource volumes and the paths are shown, however it will be appreciated that the advertisement vectors may also include global unique identifiers, resource type and upper limits, as described above. In this example, domain 602 sends messages (e.g. advertises its resources) in two directions, towards domains 604 and 610. Domain 604 sends through domain 606, then at domain 608 the two advertisement paths meet. Each domain codes a Path_ID, which in this example, comprises a global unique identifier associated with the domain, into the Path_tag field (e.g. it adds itself to the path). In this example, domains 602, 604, 606, 608 and 610 are associated with global unique identifiers A, B, C, D and X respectively.

Based on the global unique identifiers, domain 604 recognises that the advertised resource units originate from the same source domain (602 with global unique identifier A). Then Domain 608 combines the two Path_tags and adds itself to it, (resulting in a Path tag 'B,C,D,X') and sends it out to the northbound interface towards domain 604.

When the advertisement arrives back to Domain 604, the domain checks the Path_tag, and finds itself in it, so Domain 604 recognizes that the advertisement is in a loop. Then the domain 604 checks the incoming Path_tag (B,C,D,X) and the currently advertised Path_tag on its northbound interface (B). The individual IDs in the Path_tag cannot be resolved (so the path of the advertisement cannot be decrypted), however each domain may check whether two Path_tags are identical or not (as indicated by arrow 612 in FIG. 6). If the Path_tag of the advertisement incoming on southbound interface is different from the Path_tag of the current advertisement on the northbound interface, the Domain 604 may assume that the incoming advertisement could contain such resource partition(s) originated from domain 602, which have arrived via other domains (in this case via domain 610). As such, domain 604 may apply the incoming advertisement volume and update the advertisement on its northbound interface (with Path_tag='B,C,D,X'). Domain 606 may do the same.

When the advertisement arrives back at domain 608 (e.g. in round 2), domain 608 may recognise that the Path_tag of the incoming and outgoing advertisements are identical (as indicated by arrow 614), as well as the volume of incoming advertisement (originated from domain 602) via domain 610 is unchanged, so the current advertisement on the northbound interface may be kept. The same process may be performed by Domain 604 (as indicated by arrow 616). This may result in stable and proper advertised resource volumes in the case of a loop.

If the volume of incoming advertisements received by any domain in the loop is changed (e.g. if domain 608 received 10(X) from domain 602 instead of 5(X)) then the domain 608 may update the advertised resource volume and this update will spread over the loop.

As described briefly above, if an update is received, e.g. the second message comprises a new or changed indication of a resource available on a third domain, then the method 300 may further comprise determining that a message (e.g. the second message or a matching message) comprises an updated indication of a resource available on the third domain. The step of determining an estimation of the available resources on the third domain (for example the embodiments comprising summing the resource) as described above may then take account of the updated indication of the resource available on the third domain.

Figure 7:
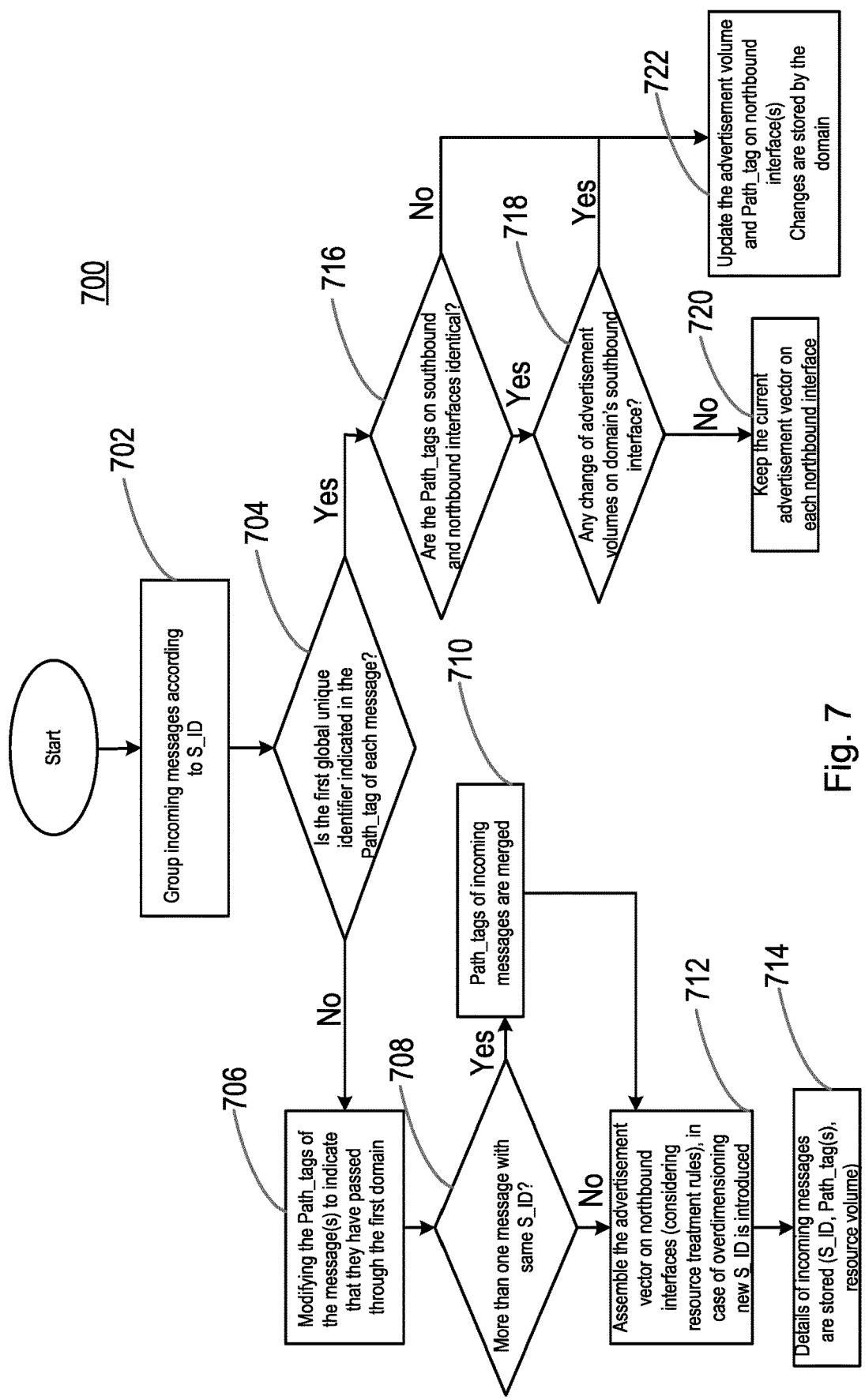
FIG. 7 is a flowchart illustrating an example method according to some embodiments herein.

Turning now to FIG. 7, FIG. 7 shows a method 700 performed by a first node associated with a first domain of a communications network. Method 700 illustrates an embodiment whereby messages comprising available resources (e.g. advertisements) comprise, for each advertised resource, a global unique identifier (referred to as S_ID in FIG. 7), and a path (referred to as a Path_ID comprising Path_Tags in FIG. 7).

In a first block 702, the method 700 comprises grouping incoming messages according to global unique identifiers. This block may comprise, for example, comparing the global unique identifier in one message to the global unique identifiers in other received messaged to determine one or matching messages as was described above with respect to the method 300. The details therein apply equally to block 702 of method 700.

In a second block 704, the method 700 comprises determining whether the first global unique identifier is indicated in the Path_tag of each matching message. Determining whether the first global unique identifier is indicated in the path was described above with respect to method 300 and the details therein will be understood to apply equally to the method 700.

If the first global unique identifier is not comprised in the messages, then in block 706, the method comprises modifying the Path_tags of the message(s) to indicate that the messages have passed through the first domain. E.g. for example, the first global unique identifier may be added to each Path_tag. Modifying path tags to indicate that they have passed through the first domain was described above with respect to method 300 and the details therein will be understood to apply equally to block 706 of method 700.

In block 708, the method comprises determining whether more than one message comprises the same global unique identifier (e.g. determining matching messages). If so, then in block 710, the path_tags of the matching messages are combined or merged into a single path_tag.

In block 712, the method 700 comprises assembling an advertisement vector for northbound interfaces (considering resource treatment rules). This may comprise determining an estimation of the available resources on a domain from the indications of resources available in the one or more matching messages and using the determined estimation as the resource estimate in the assembled advertisement vector. If overdimensioning (overprovisioning) is required, then a new global unique identifier (SID) may be introduced. Determining an estimation of the available resources on the third domain, and over provisioning were described above with respect to method 300 and the details therein will be understood to apply equally to block 712 of method 700.

In block 714, the details of the incoming messages may be stored. For example, to determine if an incoming message comprises an updated or changed advertisement vector that needs to be taken into account.

Returning to block 704, if the first global unique identifier (e.g. the identifier of the domain performing the method 700) is indicated in the path_tag of each incoming message, then the method moves to block 716 whereby the it is determined whether the path_tags on the southbound (e.g. incoming) and northbound (e.g outgoing) interfaces of the first domain are identical. Comparing a path in the second message to another path in a previous message sent by the first node in order to advertise a previously calculated estimation of the available resources on the third domain was described above with respect to the method 300 and the details therein will be understood to apply equally to block 716.

If they are, then in block 718, the first domain may determine whether there have been any updates or changes to advertised available resource volumes on the southbound interfaces.

In block 720, if there have been no updates, the method may comprise keeping the current advertisement on each northbound interface. Put another way, the received message may be sent on without any change.

If at block 718 it is determined that there has been a change of advertisement on the southbound interface, then in block 722, the method may comprise determining an estimation of the available resources taking account of the updated advertised resource volume.

Figure 8:
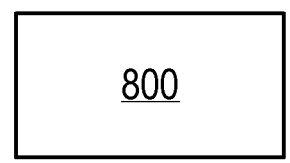
FIG. 8 is an example node according to some embodiments herein.

Turning now to other embodiments, as shown in FIG. 8, in some embodiments there is a first node 800 in a communications network. The first node 800 may comprise any node that is suitable for sending a message to a second node. In some embodiments the first node may be involved in resource orchestration. In some embodiments the first node may comprise a resource orchestrator. More generally, for example, the first node may comprise an access point (AP) (e.g., a radio access point), a base station (BSs) (e.g., a radio base station, a Node B, an evolved Node B (eNB) an NR NodeB (gNB)) or any other node suitable for performing the methods 300 and 700 as described herein. In some embodiments, the first node may comprise a server. For example, such a server may employ cloud technology or be located (e.g. distributed) in a cloud environment.

The first node 800 is adapted (e.g. configured) to send a first message to a second node associated with a second domain of the communications network, the first message comprising an indication of a resource in the first domain that is available to the second domain. The first message further comprises an anonymised first global unique identifier associated with the first domain. Sending a first message was described in detail above with respect to the methods 300 and 700 and the details therein will be understood to apply equally to the adaptation (e.g. configuration) of the first node 800.

Figure 9:
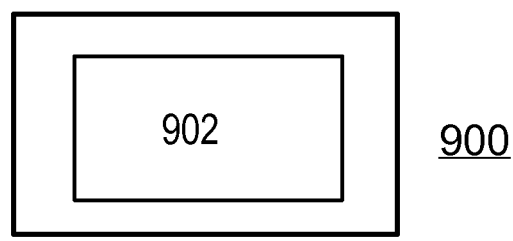
FIG. 9 is an example node according to some embodiments herein.

Turning now to FIG. 9, according to some embodiments, there is a first node 900 in a communications network. The first node 900 comprises a processor 902. The processor 902 is configured to perform the methods 300 and 700 described herein. The processor 902 may comprise one or more processors, processing units, multi-core processors and/or modules that are configured or programmed to operate in the manner described herein. In some implementations, for example, the processor 902 may comprise a plurality of (for example, interoperated) processors, processing units, multi-core processors and/or modules configured for distributed processing. It will be appreciated by a person skilled in the art that such processors, processing units, multi-core processors and/or modules may be located in different locations and may perform different blocks and/or different parts of a single block of the methods described herein.

Figure 10:
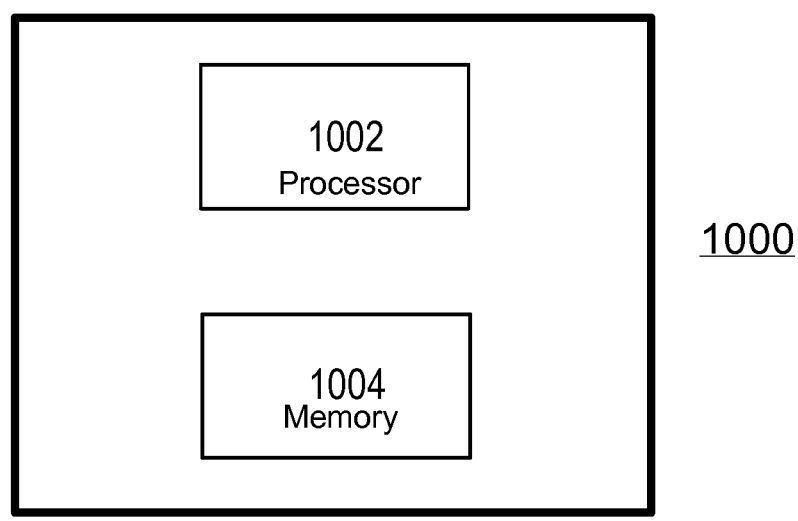
FIG. 10 is an example system according to some embodiments herein.

Turning now to FIG. 10, there is a system 1000 in a first domain of a communications network. The system 1000 comprises a memory 1004 comprising instruction data representing a set of instructions. The system 1000 further comprises a processor 1002 configured to communicate with the memory 1004 and to execute the set of instructions. The set of instructions when executed by the processor may cause the processor to perform any of the embodiments of the methods 300 and 700 as described above.

In some implementations, the instruction data can comprise a plurality of software and/or hardware modules that are each configured to perform, or are for performing, individual or multiple blocks of the method described herein. In some embodiments, the memory 1004 may be part of a device that also comprises one or more other components of the system 1000. In alternative embodiments, the memory 1004 may be part of a separate device to the other components of the system 1000.

In some embodiments, the memory 1004 may comprise a plurality of sub-memories, each sub-memory being capable of storing a piece of instruction data. In some embodiments where the memory 1004 comprises a plurality of sub-memories, instruction data representing the set of instructions may be stored at a single sub-memory. In other embodiments where the memory 1004 comprises a plurality of sub-memories, instruction data representing the set of instructions may be stored at multiple sub-memories. Thus, according to some embodiments, the instruction data representing different instructions may be stored at one or more different locations in the system 1000. In some embodiments, the memory 1004 may be used to store information, such as data relevant to calculations or determinations made by the processor 1002 of the system 1000 or from any other components of the system 1000.

The processor 1002 can comprise one or more processors, processing units, multi-core processors and/or modules that are configured or programmed to control the system 1000 in the manner described herein. In some implementations, for example, the processor 1002 may comprise a plurality of (for example, interoperated) processors, processing units, multi-core processors and/or modules configured for distributed processing. It will be appreciated by a person skilled in the art that such processors, processing units, multi-core processors and/or modules may be located in different locations and may perform different blocks and/or different parts of a single block of the method described herein.

Briefly, the set of instructions, when executed by the processor 1002, cause the processor 1002 to send a first message to a second node associated with a second domain of the communications network, the first message comprising an indication of a resource in the first domain that is available to the second domain. The first message further comprises an anonymised first global unique identifier associated with the first domain. Sending a first message was described in detail with respect to the methods 300 and 700 and the details therein will be understood to apply equally to the system 1000.

In some embodiments, there is also a computer program product comprising a computer readable medium, the computer readable medium having computer readable code embodied therein, the computer readable code being configured such that, on execution by a suitable computer or processor, the computer or processor is caused to perform the method 300 or the method 700 as described above.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method performed by a first node associated with a first domain of a communications network, the method comprising:

sending a first message to a second node associated with a second domain of the communications network, the first message comprising an indication of a resource in the first domain that is available to the second domain, wherein the first message further comprises an anonymized first global unique identifier associated with the first domain;

receiving a second message comprising: an indication of a resource available on a third domain and an anonymized third global unique identifier associated with the third domain;

comparing the third global unique identifier to one or more other global unique identifiers in one or more other received messages to determine one or more matching messages wherein the global unique identifiers in the one or more matching messages are equal to the third global unique identifier; and determining an estimation of the available resources on the third domain from the resource available on the third domain as indicated in the second message and available resources as indicated in the one or more matching messages.

2. The method of claim 1, wherein the first message further comprises an indication of the type of resource available in the first domain.

3. The method of claim 1, further comprising:

comparing the first global unique identifier to the third global unique identifier; and if the first global unique identifier matches the third global unique identifier, determining that a loop has occurred.

4. The method of claim 1, wherein determining an estimation of the available resources on the third domain comprises:

summing the resource available on the third domain as indicated in the second message to the available resources as indicated in the one or more matching messages.

5. The method of claim 4, wherein the second message further comprises an indication of an upper limit of the resource in the third domain and the method further comprises comparing the summation to the upper limit.

6. The method of claim 5, wherein:

if the summation is less than the upper limit, using the summation as the estimation of the available resources on the third domain; or if the summation is greater than the upper limit, using the upper limit as the estimation of the available resources on the third domain.

7. The method of claim 6, further comprising:

including the estimation of the available resources on the third domain and the third global unique identifier in the first message to advertise the estimated available resources on the third domain to the second domain.

8. The method of claim 5, wherein:

if the summation is greater than the upper limit, determining to overprovision the resource available on the third domain; and including an indication of the overprovisioned resource in the first message, wherein the overprovision is associated with the first global unique identifier.

9. The method of claim 5, further comprising:

dividing the summation into a first part and a second part, where the first and second parts are less than the upper limit;

including the first part of the summation in a third message;

including the second part of the summation in a fourth message; and sending the third and fourth messages from different interfaces of the first domain.

10. The method of claim 1, wherein the second message further comprises an indication of a path through the communications network from the third domain to the first domain, wherein the path comprises indications of one or more intermediate domains that the indication of a resource available on a third domain has passed through.

11. The method of claim 10, further comprising:
determining whether the first global unique identifier is indicated in the path.

12. The method of claim 11, wherein if the first global unique identifier is indicated in the path, the method further comprises:
comparing the path in the second message to another path in a previous message sent by the first node in order to advertise a previously calculated estimation of the available resources on the third domain; and
if the path and the other path are matching, using the indication of a resource available on a third domain from the second message as the estimation of the available resources on the third domain; and
including the indication of a resource available on a third domain from the second message, the anonymized third global unique identifier and the indication of the path in the first message.

13. The method of claim 1,
wherein the second message further comprises an indication of a path through the communications network from the third domain to the first domain, and wherein the path comprises indications of one or more intermediate domains that the indication of a resource available on a third domain has passed through;
wherein the method further comprises determining whether the first global unique identifier is indicated in the path, wherein if the first global unique identifier is not indicated in the path, the method further comprises comparing the path in the second message to one or more other paths in the one or more other received messages, and
wherein determining one or more matching messages comprises determining one or more matching messages wherein the global unique identifiers in the one or more matching messages are equal to the third global unique identifier and the paths in the one or more matching messages are different.

14. The method of claim 13, further comprising:
combining the paths in the one or more matching messages to create a combined path;
modifying the combined path to indicate that the first message has passed through the first domain; and
including the modified combined path in the first message.

15. The method of claim 1, wherein the first node comprises a resource orchestrator and/or forms part of a hierarchical orchestration system.

16. The method of claim 1, wherein the first message comprises a resource advertisement.

17. A first node in a communications network, comprising a processor configured to:
send a first message to a second node associated with a second domain of the communications network, the first message comprising an indication of a resource in the first domain that is available to the second domain, wherein the first message further comprises an anonymized first global unique identifier associated with the first domain;
receive a second message comprising: an indication of a resource available on a third domain and an anonymized third global unique identifier associated with the third domain;
compare the third global unique identifier to one or more other global unique identifiers in one or more other received messages to determine one or more matching messages wherein the global unique identifiers in the one or more matching messages are equal to the third global unique identifier; and
determine an estimation of the available resources on the third domain from the resource available on the third domain as indicated in the second message and available resources as indicated in the one or more matching messages.

18. A system in a first domain of a communications network, the system comprising:
a memory comprising instruction data representing a set of instructions; and
a processor configured to communicate with the memory and to execute the set of instructions, wherein the set of instructions, when executed by the processor, cause the processor to:
send a first message to a second node associated with a second domain of the communications network, the first message comprising an indication of a resource in the first domain that is available to the second domain, wherein the first message further comprises an anonymized first global unique identifier associated with the first domain;
receive a second message comprising: an indication of a resource available on a third domain and an anonymized third global unique identifier associated with the third domain;
compare the third global unique identifier to one or more other global unique identifiers in one or more other received messages to determine one or more matching messages wherein the global unique identifiers in the one or more matching messages are equal to the third global unique identifier; and
determine an estimation of the available resources on the third domain from the resource available on the third domain as indicated in the second message and available resources as indicated in the one or more matching messages.

* * * * *